United States Patent [19]

Wistuba

[11] 4,413,071
[45] Nov. 1, 1983

[54] PREPARATION OF AQUEOUS EPOXY RESIN DISPERSIONS, AND THEIR USE

[75] Inventor: Eckehardt Wistuba, Bad Durkheim, Fed. Rep. of Germany

[73] Assignee: BASF Aktiengesellschaft, Fed. Rep. of Germany

[21] Appl. No.: 273,861

[22] Filed: Jun. 15, 1981

[30] Foreign Application Priority Data

Jul. 5, 1980 [DE] Fed. Rep. of Germany ....... 3025609

[51] Int. Cl.³ ............................................. C08L 63/10
[52] U.S. Cl. .................................... 523/411; 523/414
[58] Field of Search ............... 523/404, 411, 414, 417, 523/418, 420

[56] References Cited

U.S. PATENT DOCUMENTS

| | | | |
|---|---|---|---|
| 3,020,250 | 2/1962 | Norwalk | 260/7 |
| 3,129,133 | 4/1964 | Doyle et al. | |
| 3,160,676 | 12/1964 | Mabrey | 523/414 |
| 3,335,105 | 8/1967 | Burnthall | 523/417 |
| 3,449,280 | 6/1969 | Frigstad | 523/417 |
| 3,449,281 | 6/1969 | Sullivan et al. | 260/292 |
| 3,870,666 | 3/1975 | Becker | 523/417 |
| 3,879,324 | 4/1975 | Timmons et al. | 260/29.2 EP |
| 3,905,929 | 9/1975 | Noll | 260/29.2 TN |
| 3,935,146 | 1/1976 | Noll et al. | 260/29.2 TN |
| 4,174,332 | 11/1979 | Honig | 523/404 |

FOREIGN PATENT DOCUMENTS

| | | |
|---|---|---|
| 286647 | of 0000 | Austria . |
| 879750 | 8/1971 | Canada . |
| 1669772 | of 0000 | Fed. Rep. of Germany . |
| 1925941 | of 0000 | Fed. Rep. of Germany . |
| 2332165 | of 0000 | Fed. Rep. of Germany . |
| 2507842 | of 0000 | Fed. Rep. of Germany . |
| 2507884 | of 0000 | Fed. Rep. of Germany . |
| 2537207 | of 0000 | Fed. Rep. of Germany . |
| 2800323 | of 0000 | Fed. Rep. of Germany . |
| 2376881 | of 0000 | France . |

*Primary Examiner*—Paul R. Michl
*Attorney, Agent, or Firm*—Keil & Witherspoon

[57] ABSTRACT

A process for the preparation of aqueous epoxy resin dispersions, wherein an epoxy resin having more than one 1,2-epoxide group per molecule is reacted with from 1 to 30% by weight, based on epoxy resin, of a protective colloid, containing basic nitrogen and having an amine number of from 10 to 90, in the presence of from 50 to 1,000 mole percent, relative to the amount of basic nitrogen in the protective colloid, of an acid, and in the presence or absence of one or more organic solvents, at from 50° to 150° C., the reaction product is dispersed by adding water, and any organic solvent present is distilled off. The novel aqueous epoxy resin dispersions are used, for example, to produce coatings.

6 Claims, No Drawings

PREPARATION OF AQUEOUS EPOXY RESIN DISPERSIONS, AND THEIR USE

The present invention relates to a process for the preparation of aqueous epoxy resin dispersions, wherein an epoxy resin is reacted with a protective colloid, containing basic nitrogen, in the presence of an acid, and the reaction products are dispersed by adding water.

The previously disclosed processes for the preparation of aqueous epoxy resin dispersions refer to the use of surfactants, such as anionic and cationic compounds (U.S. Pat. No. 3,879,324), as well as nonionic compounds, for example mixtures of nonylphenoxypoly-(ethoxy)$_{19}$-ethanol and alkylphenol polyglycol ethers containing from 4 to 9 moles of alkylene oxide in adduct form (Canadian Pat. No. 879,750), poly-(ethylene oxide) esters of fatty acids (German Laid-Open Application DOS No. 2,800,323) and adducts of from 25 to 30 moles of alkylene oxide with abietic acid (Austrian Pat. No. 286,647 and German Published Application DAS No. 1,669,772) in order to disperse epoxy resins in water.

Furthermore, the following dispersants are discribed: synthetic compounds, proteins (U.S. Pat. No. 3,020,250) and amine/epoxy resin condensates (U.S. Pat. No. 3,449,281 and German Laid-Open Application DOS No. 1,925,941).

Emulsifier mixtures, which consist, for example as described in German Published Application DAS No. 2,332,165, of abietic acid polyglycol esters, polyglycol esters of fatty acids and/or polyglycol ethers of p-alkylphenol and long-chain aliphatic alcohols of 8 to 18 carbon atoms, have also been disclosed. Processes for the preparation of aqueous dispersions, in which the substance to be dispersed, together with the dispersant, is first dissolved in an organic solvent, water is added and the solvent is then distilled off, are also known (U.S. Pat. Nos. 3,905,929 and 3,935,146 and German Laid-Open Applications DOS Nos. 2,537,207; 2,507,884 and 2,507,842).

None of the above processes for the preparation of aqueous epoxy resin dispersions is fully satisfactory. Thus, if small amounts of the emulsifiers and protective colloids described above are used, phase separation in the epoxy resin dispersion is observed, ie. the dispersed epoxy resin sediments. If too much of the dispersant is used, the water resistance of the coatings based on such epoxy resin dispersions is adversely affected, this being particularly true of systems which harden at room temperature.

It is an object of the present invention to provide stable aqueous dispersions of epoxy resins by the use of reactive protective colloids which can be chemically incorporated in the resin.

I have found that this object is achieved by employing certain copolymers, containing basic nitrogen groups, as protective colloids for the preparation of aqueous epoxy resin dispersions, these colloids being particularly suitable for the said purpose.

Accordingly, the present invention relates to a process for the preparation of aqueous epoxy resin dispersions containing from 40 to 75% by weight of water, wherein (A) an epoxy resin having more than one 1,2-epoxide group per molecule is reacted with (B) from 1 to 30% by weight, based on the epoxy resin (A), of a protective colloid which contains basic nitrogen and has an amine number of from 10 to 90, in the presence of (C) from 50 to 1,000 mole percent, relative to the amount of basic nitrogen in the protective colloid (B), of an acid, and in the presence or absence of one or more organic solvents, at from 50° to 150° C., the reaction product is dispersed by adding water and any organic solvent present is then distilled off.

Suitable protective colloids (B) containing basic nitrogen are, in particular, copolymers which have K values of from 20 to 60 and which contain, as copolymerized units, vinyl propionate and vinylpyrrolidone, as well as vinylimidazole, vinylpyridine and/or dimethylaminoethyl acrylate or methacrylate, with or without up to 35% by weight of other copolymerizable ethylenically unsaturated compounds.

The present invention further relates to the use of the aqueous epoxy resin dispersions, prepared according to the invention, for the production of coatings.

An important advantage of the aqueous epoxy resin dispersions according to the invention, relative to epoxy resin solutions, is that because of the absence of solvents, the aqueous systems do not pollute the environment. Compared to the epoxy resin dispersions of the prior art, the dispersions prepared by the process according to the invention show greater stability. Furthermore, the hardened finishes have very good water resistance.

The following details may be noted in respect of the novel process of preparation, and the starting materials employed therein:

(A) The epoxy resin (A) hving more than one 1,2-epoxide group per molecule can be a conventional epoxy resin, for example having 2, 3 or more epoxide groups per molecule, as well as mixtures of such polyepoxides. Examples of suitable epoxy resins are those based on reaction products of epichlorohydrin with bisphenol A (for example ®Epikote from Shell), or epoxides of polyunsaturated hydrocarbons (dicyclopentadiene or cyclohexadiene), or epoxy-ethers of polyhydric alcohols, which in general have molecular weights of from 300 to 3,000 and epoxide values of from 0.65 to 0.1. Mixtures of such polyepoxides with monoepoxides can also be used.

(B) Suitable protective colloids (B) containing basic nitrogen have amine numbers of from 10 to 90, preferably from 20 to 45. In particular, copolymers with K values (measured by the Fikentscher method) of from 20 to 70 can be used. For the process of preparation according to the invention, the nitrogen-basic protective colloids (B) are employed in an amount of from 1 to 30, preferably from 5 to 20, % by weight, based on epoxy resin (A).

Preferred protective colloids containing basic nitrogen are vinyl propionate/vinylpyrrolidone copolymers which are modified with vinylimidazole, vinylpyridine and/or dimethylaminoethyl acrylate or methacrylate and have K values of from 20 to 60, preferably from 25 to 45. The ratio vinyl propionate:vinylpyrroloidone is preferably from 1:8 to 8:1, especially 1:2. In the copolymer, the vinyl propionate can be replaced entirely or partially by vinyl acetate and 50% or less of the vinylpyrrolidone can be replaced by vinylcaprolactam.

The content of basic nitrogen compounds, such as vinylimidazole, dimethylaminoethyl acrylate or methacrylate and vinylpyridine depends on the amine number of the protective colloid, which is from 10 to 90, preferably from 20 to 45.

The protective colloid (B), containing basic nitrogen, can contain up to 35% by weight of other ethylenically unsaturated compounds, for example acrylamide, methacrylamide, acrylic acid, methacrylic acid and acrylic acid esters or methacrylic acid esters of $C_1-C_{18}$-alcohols, as copolymerized units.

The protective colloids, containing basic nitrogen, which can be chemically incorporated into the resin, are in general prepared by conventional polymerization processes, for example by solution polymerization in water or in organic solvents, such as alcohols, eg. tert.-butanol, polyols, eg. glycol and glycerol, ether-ols, for example monoalkyl-diols, eg. butylglycol, propylglycol, ethylglycol, methylglycol and diethylene glycol mono-n-butyl ether, ethers, for example dialkyl-diols, eg. diethylene glyclol diethyl ether, ketones and esters.

Preferably, water-dilutable protective colloid solutions are used to prepare the epoxy resin dispersions according to the invention.

(C) The acids (C) employed in the process according to the invention can be inorganic acids, eg. hydrochloric acid, sulfuric acid or phosphoric acid, or organic acids, eg. carboxylic acids and sulfonic acids. The following are preferred: carboxylic acids, such as $C_1-C_3$-carboxylic acids, eg. formic acid, acetic acid and propionic acid, dicarboxylic acids, eg. oxalic acid and maleic acid, hydroxycarboxylic acids, eg. lactic acid and tartaric acid, and dicarboxylic acid half-esters, eg. monomethyl maleate, mono-triethylglycol succinate, monooctaethyleneglycol maleate and mono-(triethylene glycol mono-n-butyl ether) succinate. According to the invention, the amount of component (C) employed is from 50 to 1,000, preferably from 100 to 500, mole percent relative to the basic nitrogen of the protective colloid (B).

The acid-catalyzed reaction between the epoxy resin (A) and the protective colloid, containing basic nitrogen, which can be chemically incorporated into the resin is carried out at from 50° to 150° C., preferably from 65° to 95° C., in the melt or in a solvent which boils below 160° C., such as an aliphatic, cyclic or aromatic hydrocarbon, halohydrocarbon, alcohol, ketone or ester or a mixture of these solvents. The reaction time depends on the temperature and is in general from 10 minutes to 4 hours; the requisite reaction time can be determined by following the acid number.

The epoxy resin dispersions obtained are stable and can be stored for several months without decomposition.

The epoxy resin dispersions according to the invention can be used to coat paper, textiles, plastics, concrete, road surfaces and metals.

Hardeners, such as amines and polyaminoamides, dyes, fillers, pigments and solvents can be added to the epoxy resin dispersions according to the invention.

The epoxy resin dispersions according to the invention are particularly advantageously employed in formulating aqueous surface-coating systems, for example electrocoating finishes, coil-coating lacquers and coatings for recording tapes. The coating compositions prepared using the epoxy resin dispersions are equivalent in physical properties, adhesion, appearance and the like to the conventional coating compositions which employ organic solvents. The water-resistance of the coatings which have been dried at room temperature is also equivalent to that of coatings obtained from solvent-based systems.

In the Examples, parts and percentages are by weight, unless stated otherwise.

EXAMPLE 1

285 parts of an epoxy resin (based on bisphenol A and epichlorohydrin), having a mean molecular weight of 370 and an epoxide value of 0.52, 52.8 parts of a 51.7% strength solution, in butylglycol, of a protective colloid consisting of a polymer composed of 30 parts of vinyl propionate, 60 parts of vinylpyrrolidone and 10 parts of vinylimidazole and having a K value of 40.8 according to DIN 53,726 and an amine number of 30, and 9 parts of glacial acetic acid are mixed, with stirring, and the mixture is heated at 80° C. After 45 minutes, the acid number is 0. 300 parts of methyl ethyl ketone are added to the reaction mixture. After 10 minutes, 558 parts of distilled water are added dropwise to the reaction mixture over 45 minutes, and at the same time the methyl ethyl ketone is distilled off under reduced pressure. The epoxy resin dispersion thus obtained has a solids content of 43.3% and an epoxide value of 0.18.

EXAMPLE 2

43 parts of the epoxy resin dispersion from Example 1 are mixed with 65 parts of a 33% strength aqueous dispersion of a polyaminoamide based on oleic acid and diethylenetriamine and having an amine number of 200–300 and a H-active equivalent of 155–160, and the mixture is coated onto steel sheet, pre-dried for 15 minutes at room temperature and hardened at 150° C. The test results are shown in the Table below.

Test results of the epoxy resin dispersion mixed with hardener (polyaminoamide):
Stability of the mixture: very good, no demixing
Wettability of the steel sheet: good
Pendulum hardness under the hardening conditions shown:

| | |
|---|---|
| Room temperature, 48 hours: | 115 sec |
| 150° C. 30 min: | 175 sec |
| 150° C. 60 min: | 185 sec |
| 12 hours' storage in water: | No observable change in the surface-coating films. |

I claim:
1. A process for the preparation of an aqueous epoxy resin dispersion containing from 40 to 75% by weight of water, wherein
   (A) an epoxy resin having more than one 1,2-epoxide group per molecule is reacted with
   (B) from 1 to 30% by weight, based on the epoxy resin (A), of a protective colloid which contains basic nitrogen and has an amine number of from 10 to 90, said protective colloid being a copolymer which contains, as copolymerized units, vinyl propionate and vinylpyrrolidone as well as vinylimidazole, vinylpyridine or dimethylaminoethyl acrylate or methacrylate, with or without up to 35% by weight of other copolymerizable ethylenically unsaturated compounds in the presence of
   (C) from 50 to 1,000 mole percent, relative to the amount of basic nitrogen in the protective colloid (B), of an acid, and in the presence or absence of one or more organic solvents, at from 50° to 150° C., the reaction product is dispersed by adding water and any organic solvent present is then distilled off.

2. The process of claim 1, wherein component (B) is a protective colloid containing basic nitrogen and having an amine number from 20 to 45.

3. The process of claim 1 or 2, wherein the protective colloid (B) has a K value of from 20 to 60.

4. The process of claim 1, wherein the protective colloid (B), containing basic nitrogen, is a copolymer which contains vinyl propionate and vinylpyrrolidone as copolymerized units in a weight ratio of from 1:8 to 8:1.

5. The process of claim 3, wherein the protective colloid (B), containing basic nitrogen, is a copolymer wherein the vinyl propionate units have been replaced at least partially by vinyl acetate units and wherein the vinylpyrrolidone units have been replaced to the extent of up to 50% by weight by vinylcaprolactam.

6. A process for the production of coatings, wherein in an aqueous epoxy resin dispersion obtained by the process set forth in claim 1 is used as the coating composition.

* * * * *